(No Model.)
J. H. JOHNSON.
HAY RAKE.
No. 369,060. Patented Aug. 30, 1887.
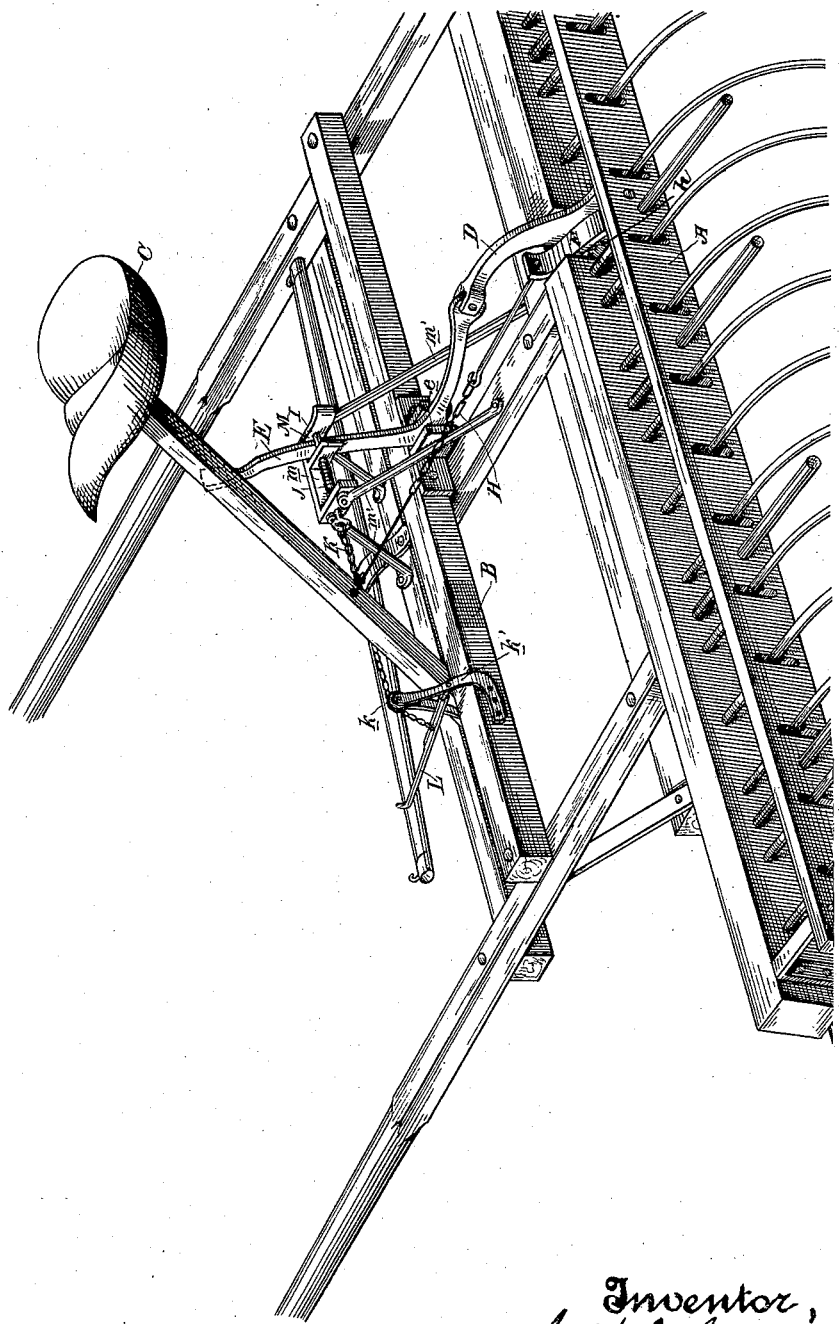
Witnesses,
Geo. H. Strong.
J. H. Morse.
Inventor,
J. H. Johnson.
By Dewey & Co.
Attys ic
UNITED STATES PATENT OFFICE.

JOHN H. JOHNSON, OF TRAVER, CALIFORNIA.

HAY-RAKE.

SPECIFICATION forming part of Letters Patent No. 369,060, dated August 30, 1887.

Application filed March 22, 1887. Serial No. 232,005. (No model.)

*To all whom it may concern:*

Be it known that I, JOHN H. JOHNSON, of Traver, Tulare county, State of California, have invented an Improvement in Hay-Rakes; and I hereby declare the following to be a full, clear, and exact description of the same.

My invention relates to the class of hay-rakes, and especially to a certain new and useful improvement in such rakes, the object of which is to hold the operating-lever in such a position as to keep the tines of the rake down upon the ground, no matter how heavy the load may be.

My invention consists in the construction and combination of devices hereinafter described and claimed.

The figure is a perspective view of a hay-rake showing my improvement.

A is the rocking tine-carrying head of an ordinary wheeled hay-rake.

B is the front part of the frame, carrying the seat C.

D is a crank on the head A of the rake, and E is a bent lever pivoted at $e$ to the frame B and at its rear end to the crank D, the upper end of said lever extending within reach of the hand or foot of the driver, as may be required. The operation of this lever is the same as in all rakes of this class, and may be described briefly as follows: By pressing the lever E forward its other end raises and forces back the crank D of the head A, thereby oscillating said head, so as to throw its tines down to the ground in a raking position. As long as the pressure on the lever is continued the tines of the rake are held down; but when the pressure is relieved they may rise and the dumping take effect, which said dumping is usually automatically accomplished, by means of a well-known apparatus which I have here partially illustrated, by the spring-actuated piece F, secured to the head A and thrown to its engagement with a ratchet, $h$, upon the axle by means of the chain H, the forward end of which is secured to the seat-standard or other support. By pressing down upon this chain the spring-piece F is thrown to its engagement with the ratchet on the axle, whereby the rotating axle turns the head A of the rake, thereby lifting its tines. This, as I have said before, is the ordinary construction and operation of a well-known horse-rake.

It is a very difficult matter to keep the requisite pressure upon the lever E in order to hold the tines of the rake down, and when a heavy load is taken the driver has to brace himself against the lever with all his force. I overcome this disadvantage by my invention, which I shall now particularly describe.

I is a pin or bolt adapted to cross the path of the lever E. It is projected by means of the spring J, and is retracted by means of the chain K, passing over the guide-pulley $k$ in the top of a forked standard, $k'$, and attached to a lever, L, pivoted to said standard. This lever may be located on either side of the seat-standard, though I prefer to place it upon the left, as shown, so that it may be operated by the left foot of the driver while his right foot is engaged with the chain H of the self-dumping mechanism.

The pin or bolt I is mounted and guided in a forked or slotted guide, M, which also receives the lever E, and the spring J, which projects the pin or bolt, is seated within a part, $m$, of the guide, said guide being supported by means of legs $m'$, bolted to the frame of the machine.

The operation of this mechanism is as follows: The driver places his foot upon the lever L, thereby withdrawing the cross pin or bolt I from across the guide M, so that with his other foot or hand, as the case may be, he may force the lever E forward into said guide, thereby throwing the tines of the rake down to the ground. As soon as this is done, he releases the lever L from his left foot, whereupon the spring J throws the pin or bolt I across the guide, behind the lever E, thereby holding it forward and keeping the tines of the rake down to the ground. When he wishes to dump the rake, he places his foot again upon the lever L, so as to retract the pin, thereby freeing the lever E, and his right foot he places upon the chain H of the self-dumping mechanism, whereby the object is accomplished.

Having thus described my invention, what I claim as new, and desire to secure by Letters Patent, is—

In a hay-rake, the oscillating tine-carrying head A, having a crank, the frame portion B of the machine, and the pivoted bent lever E, connected with the crank, in combination with the guide-piece M, supported from the head and frame of the machine and receiving the lever, the bolt I, mounted in said guide-piece and adapted to move behind the lever, the spring J, for projecting the bolt, the forked standard k' on the frame B, having a guide-pulley, k, in its top, the chain K, connected with the bolt and passing over the guide-pulley, and the pivoted lever L, to which the chain is connected, substantially as herein described.

In witness whereof I have hereunto set my hand.

JOHN H. JOHNSON.

Witnesses:
  A. H. HIATT,
  J. H. BLOOD.